US010959187B2

(12) United States Patent
Takahashi et al.

(10) Patent No.: US 10,959,187 B2
(45) Date of Patent: Mar. 23, 2021

(54) WIRELESS COMMUNICATION APPARATUS, WIRELESS COMMUNICATION METHOD, AND RECORDING MEDIUM

(71) Applicant: CASIO COMPUTER CO., LTD., Shibuya-ku, Tokyo (JP)

(72) Inventors: Toshihiro Takahashi, Kunitachi (JP); Takahiro Tomida, Hamura (JP); Tsutomu Terazaki, Saitama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/591,547

(22) Filed: Oct. 2, 2019

(65) Prior Publication Data
US 2020/0112924 A1    Apr. 9, 2020

(30) Foreign Application Priority Data
Oct. 4, 2018  (JP) .............................. JP2018-189329

(51) Int. Cl.
*H04W 52/32*   (2009.01)
*H04W 4/80*   (2018.01)
*H04W 4/06*   (2009.01)

(52) U.S. Cl.
CPC .......... *H04W 52/322* (2013.01); *H04W 4/06* (2013.01); *H04W 4/80* (2018.02)

(58) Field of Classification Search
CPC ........ H04W 52/322; H04W 4/80; H04W 4/06
See application file for complete search history.

(56) References Cited

U.S. PATENT DOCUMENTS 9,026,048 B2 *   5/2015   Royston ............. G06K 7/10128
                                                       455/41.1
9,106,275 B2 *   8/2015   Griffin ...................... H04B 5/02
9,455,768 B2 *   9/2016   Griffin ...................... H04B 1/38
(Continued)

FOREIGN PATENT DOCUMENTS

JP       2005328231 A  *  11/2005
JP       2012142877 A      7/2012
(Continued)

OTHER PUBLICATIONS

Extended European Search Report (EESR) dated Feb. 28, 2020, issued in counterpart European Application No. 19198928.4.
(Continued)

*Primary Examiner* — Devan A Sandiford
(74) *Attorney, Agent, or Firm* — Holtz, Holtz & Volek PC (57) ABSTRACT

A wireless communication apparatus includes a wireless communicator and a controller. The wireless communicator is configured to wirelessly communicate with other wireless communication apparatuses. The controller is configured to control the wireless communicator to broadcast transmission information, and when the wireless communicator receives a request corresponding on the transmission information from at least one of the other wireless communication apparatuses having received the transmission information during the broadcasting of the transmission information, control the wireless communicator to change transmission power of the transmission information to the other wireless communication apparatuses.

19 Claims, 6 Drawing Sheets

(56) References Cited

U.S. PATENT DOCUMENTS

| | | | | |
|---|---|---|---|---|
| 9,462,623 | B2* | 10/2016 | Jakusovszky | H04W 8/005 |
| 9,473,941 | B1* | 10/2016 | Palin | H04W 12/0609 |
| 9,647,884 | B2* | 5/2017 | Hillan | H04B 5/0031 |
| 9,756,582 | B2 | 9/2017 | Liu | |
| 10,048,909 | B2* | 8/2018 | Ito | G06F 3/1292 |
| 10,063,112 | B2* | 8/2018 | Tachiwa | H02J 50/90 |
| 10,128,969 | B2* | 11/2018 | Yasuzaki | H04N 1/00106 |
| 10,588,089 | B1* | 3/2020 | Raghavan | H04B 17/318 |
| 2010/0317289 | A1* | 12/2010 | Desai | H04B 17/318 455/41.2 |
| 2012/0077433 | A1* | 3/2012 | Walker | H04L 69/14 455/41.1 |
| 2013/0170420 | A1* | 7/2013 | Kobayashi | H04W 52/0245 370/311 |
| 2013/0344804 | A1* | 12/2013 | Chen | H04B 5/02 455/41.1 |
| 2015/0099469 | A1* | 4/2015 | Goldstein | H04M 1/7253 455/41.2 |
| 2015/0245298 | A1* | 8/2015 | Takahashi | H04W 52/0235 455/574 |
| 2017/0359786 | A1* | 12/2017 | Liu | H04W 52/245 |
| 2018/0006746 | A1* | 1/2018 | Yasuzaki | H04N 1/00307 |
| 2018/0176009 | A1* | 6/2018 | Agerstam | H04W 76/11 |
| 2019/0007574 | A1* | 1/2019 | Takarabe | H04W 76/14 |
| 2019/0104479 | A1* | 4/2019 | Kyou | H04W 52/22 |
| 2019/0297481 | A1* | 9/2019 | Tomida | H04W 4/80 |

FOREIGN PATENT DOCUMENTS

| | | | |
|---|---|---|---|
| JP | 2019068338 A | * | 4/2019 |
| WO | 2015078277 A1 | | 6/2015 |

OTHER PUBLICATIONS

Anonymous, "Core System Package [Low Energy Controller volume]", Specification of the Bluetooth System, XP055632994, Retrieved from the Internet: URL:https://www.bluetooth.com/specifications/archived-specifications/ [retrieved on Oct. 16, 2019], Dec. 6, 2016, pp. 2571-2588.

* cited by examiner

WIRELESS COMMUNICATION APPARATUS, WIRELESS COMMUNICATION METHOD, AND RECORDING MEDIUM

CROSS-REFERENCE TO RELATED APPLICATION

This application claims the benefit of Japanese Patent Application No. 2018-189329, filed on Oct. 4, 2018, the entire disclosure of which is incorporated by reference herein.

TECHNICAL FIELD

The technical field relates to a wireless communication apparatus, a wireless communication method, and a recording medium.

BACKGROUND

Some known techniques involve causing a slave device to intermittently broadcast advertising packets at a predetermined time interval so as to be found by a master device, according to the Bluetooth (registered trademark) low energy (BLE) standard, which is one of the short-range wireless communication standards (for example, Unexamined Japanese Patent Application Kokai Publication No. 2012-142877).

SUMMARY

According to one aspect of the present disclosure, a wireless communication apparatus includes a wireless communicator and a controller. The wireless communicator is configured to wirelessly communicate with other wireless communication apparatuses. The controller is configured to control the wireless communicator to broadcast transmission information, and when the wireless communicator receives a request corresponding on the transmission information from at least one of the other wireless communication apparatuses having received the transmission information during the broadcasting of the transmission information, control the wireless communicator to change transmission power of the transmission information to the other wireless communication apparatuses.

BRIEF DESCRIPTION OF THE DRAWINGS

A more complete understanding of this application can be obtained when the following detailed description is considered in conjunction with the following drawings, in which.

DETAILED DESCRIPTION

Embodiments of the disclosure will now be described with reference to the accompanying drawings.

Figure 1:
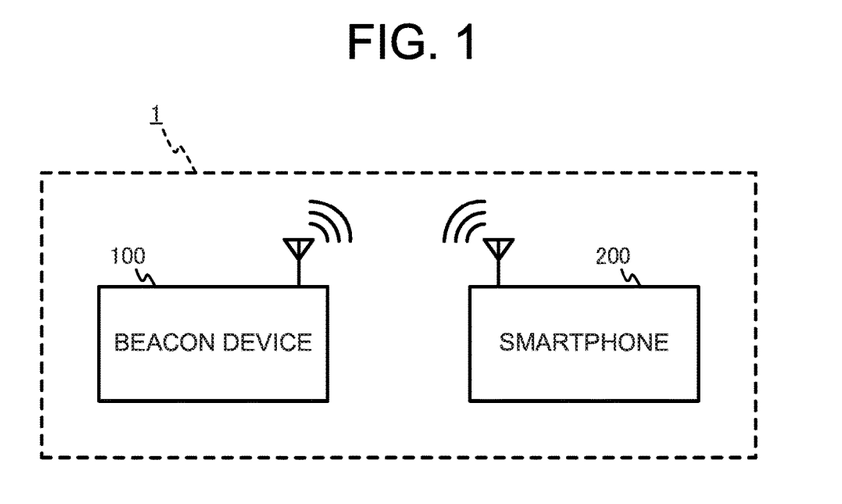
FIG. 1 illustrates an exemplary configuration of a wireless communication system according to an embodiment.

FIG. 1 illustrates an exemplary configuration of a wireless communication system 1 according to an embodiment. In the exemplary configuration illustrated in FIG. 1, the wireless communication system 1 includes a beacon device 100 and a smartphone 200. The beacon device 100 and the smartphone 200 conduct wireless communication with each other based on the Bluetooth (registered trademark) low energy (hereinafter referred to as "BLE") standard. The BLE standard (mode) is one of the short-range wireless communication standards that are called Bluetooth (registered trademark) and is defined so as to reduce electric power consumption. In this embodiment, the beacon device 100 and the smartphone 200 operate in accordance with the Bluetooth (registered trademark) 5 specification released in December 2016. Based on the BLE standard, the beacon device 100 serves as a slave for transmitting an advertising packet (described below) while the smartphone 200 serves as a master for receiving the advertising packet in the embodiment.

Figure 2:
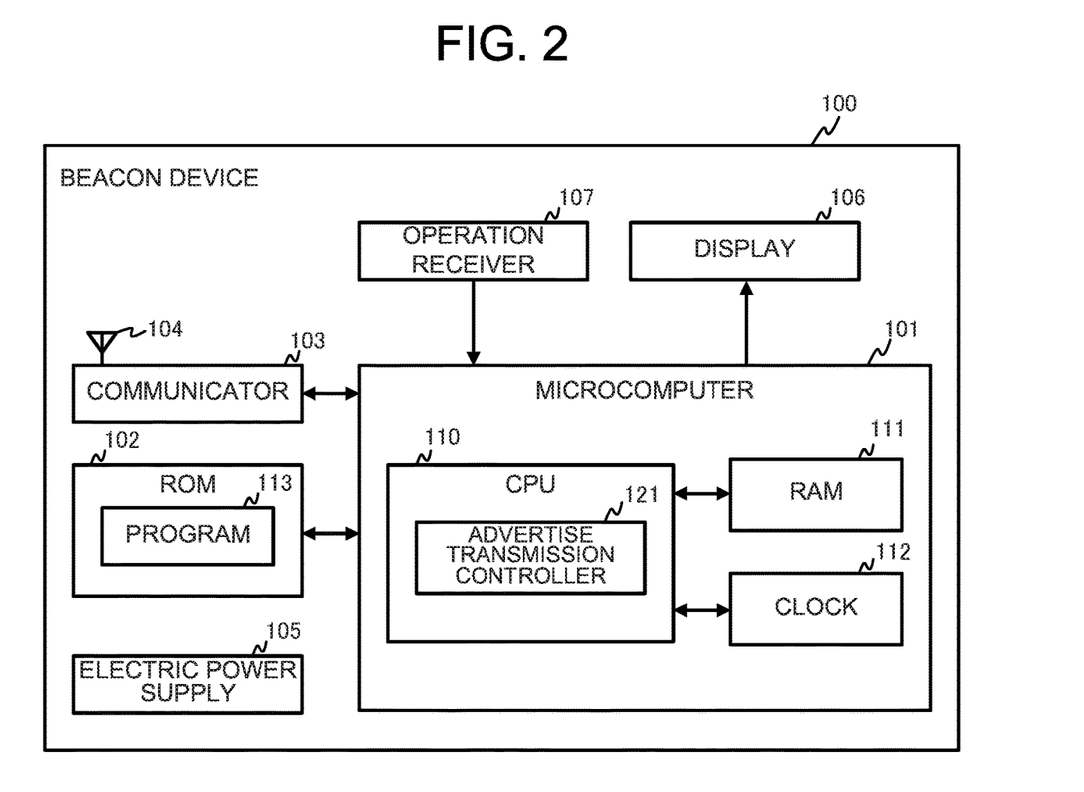
FIG. 2 is a block diagram illustrating a configuration of a beacon device according to the embodiment.

A hardware configuration of the beacon device 100 according to the embodiment will now be described. FIG. 2 is a block diagram illustrating a configuration of the beacon device 100 according to the embodiment. The beacon device 100 is equipped with a microcomputer 101, a read only memory (ROM) 102, a communicator 103, an antenna 104, an electric power supply 105, a display 106, and an operation receiver 107.

The microcomputer 101 includes a central processing unit (CPU) 110 serving as a controller, a random access memory (RAM) 111 serving as a storage, and a clock 112. The RAM 111 and the clock 112 may be provided outside the microcomputer 101 instead of inside the microcomputer 101. The ROM 102, the communicator 103, the antenna 104, and the electric power supply 105 may be provided inside the microcomputer 101 instead of outside the microcomputer 101.

The CPU 110 is a processor for various calculations and comprehensive control of the entire operation of the beacon device 100. The CPU 110 reads control programs from the ROM 102 and loads the programs into the RAM 111, to execute various operational processes, such as calculation control and display control associated with various functions. The CPU 110 also controls the communicator 103 such that the communicator 103 communicates with the smartphone 200.

The RAM 111 is a volatile memory, such as a static random access memory (SRAM) or a dynamic random access memory (DRAM). The RAM 111 stores temporary data and various setting data.

The clock 112 includes an oscillator circuit, a frequency dividing circuit, and a clock circuit. The clock 112 determines a current time.

The ROM 102 includes, for example, a non-volatile memory for storing control programs and initial setting data. The control programs contain a program 113 associated with control of various processes for controlling the wireless communication with the smartphone 200.

The communicator 103 includes, for example, a radio frequency (RF) circuit, a baseband (BB) circuit, and a memory circuit. The communicator 103 processes the radio signals received via the antenna 104 through an operation, such as demodulation and decoding, and outputs the resulting signals to the CPU 110. The communicator 103 also processes the signals input from the CPU 110 through an operation, such as coding and modulation, and transmits the resulting signals to an external device via the antenna 104. In this embodiment, the communicator 103 is achieved by a Bluetooth (registered trademark) controller that transmits and receives radio signals based on the BLE standard.

The electric power supply 105 includes, for example, a battery and a voltage converter circuit. The electric power supply 105 supplies electric power at an operating voltage of each component of the beacon device 100. The battery of the electric power supply 105 is, for example, a primary battery (for example, a button buttery) or a secondary battery (for example, a lithium ion battery).

The display 106 includes, for example, light emitting diodes (LEDs). The display 106 displays a status of the beacon device 100, for example.

The operation receiver 107 includes, for example, buttons or switches. The operation receiver 107 receives an input operation from a user and outputs an electrical signal corresponding to the input operation to the microcomputer 101.

Figure 3:
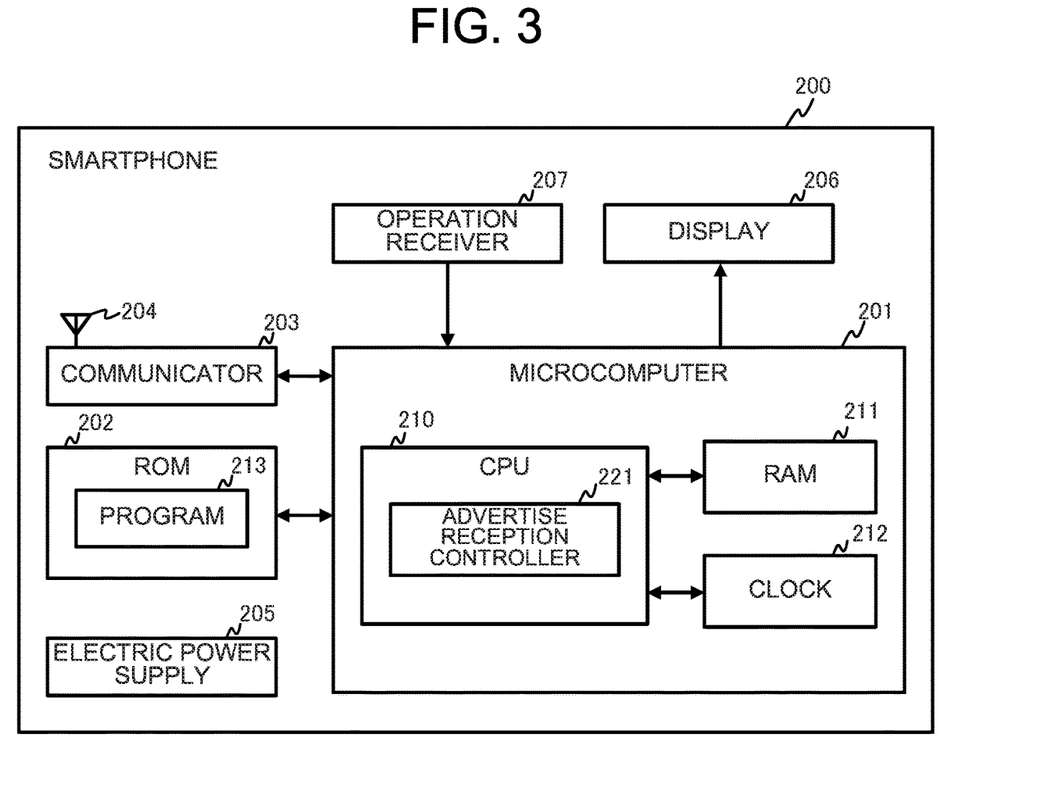
FIG. 3 is a block diagram illustrating a configuration of a smartphone according to the embodiment.

A hardware configuration of the smartphone 200 according to the embodiment will now be described. FIG. 3 is a block diagram illustrating a configuration of the smartphone 200 according to the embodiment. The smartphone 200 is equipped with a microcomputer 201, a ROM 202, a communicator 203, an antenna 204, an electric power supply 205, a display 206, and an operation receiver 207.

The microcomputer 201 includes a CPU 210 serving as a controller, a RAM 211 serving as a storage, and a clock 212. The RAM 211 and the clock 212 may be provided outside the microcomputer 201 instead of inside the microcomputer 201. The ROM 202, the communicator 203, the antenna 204, and the electric power supply 205 may be provided inside the microcomputer 201 instead of outside the microcomputer 201.

The CPU 210 is a processor for various calculations and comprehensive control of the entire operation of the smartphone 200. The CPU 210 reads control programs from the ROM 202 and loads the programs into the RAM 211, to execute various operational processes, such as calculation control and display control associated with various functions. The CPU 210 also controls the communicator 203 such that the communicator 203 communicates with the beacon device 100.

The RAM 211 is a volatile memory, such as a SRAM or a DRAM. The RAM 211 stores temporary data and various setting data.

The clock 212 includes an oscillator circuit, a frequency dividing circuit, and a clock circuit. The clock 212 determines a current time.

The ROM 202 includes, for example, a non-volatile memory for storing control programs and initial setting data. The control programs contain a program 213 associated with control of various processes for controlling the wireless communication with the beacon device 100.

The communicator 203 includes, for example, a radio frequency (RF) circuit, a baseband (BB) circuit, and a memory circuit. The communicator 203 processes the radio signals received via the antenna 204 through an operation, such as demodulation and decoding, and outputs the resulting signals to the CPU 210. The communicator 203 also processes the signals input from the CPU 210 through an operation, such as coding and modulation, and transmits the resulting signals to an external device via the antenna 204. In this embodiment, the communicator 203 is achieved by a Bluetooth (registered trademark) controller that transmits and receives radio signals based on the BLE standard.

The electric power supply 205 includes, for example, a battery and a voltage converter circuit. The electric power supply 205 supplies electric power at an operating voltage of each component of the smartphone 200. The battery of the electric power supply 205 is, for example, a primary battery (for example, a button buttery) or a secondary battery (for example, a lithium ion battery).

The display 206 includes, for example, a display panel, such as a liquid crystal display (LCD) or an organic electroluminescent (EL) display, and a driver that outputs driving signals, which correspond to a type of the display panel, to the display panel based on the control signals input from the microcomputer 201. The display 206 displays the information received from the beacon device 100, for example.

The operation receiver 207 receives an input operation from the user and outputs an electrical signal corresponding to the input operation to the microcomputer 201. For example, the operation receiver 207 may be a touch sensor overlapping with the display panel of the display 206 so that the touch sensor and the display panel constitute a touch panel. In this case, the touch sensor detects the position and mode of a touch operation of the user on the touch sensor, and outputs an operational signal, corresponding to the detected position and mode of the touch operation, to the microcomputer 201.

A functional configuration of the CPU 110 of the beacon device 100 according to the embodiment will now be described. With reference to FIG. 2, the CPU 110 functions as an advertise transmission controller 121. Alternatively, the functions of the advertise transmission controller 121 may be performed by a processor, such as the CPU of the communicator 103, other than the microcomputer 101.

The CPU 110 functioning as the advertise transmission controller 121 controls the communicator 103 such that the communicator 103 broadcasts an advertising packet at a first transmission power. If the communicator 103 receives a scan request from the smartphone 200 that received the advertising packet, the CPU 110 functioning as the advertise transmission controller 121 controls the communicator 103 such that the communicator 103 transmits an advertising packet to the smartphone 200 at a second transmission power higher than the first transmission power. The advertising packet is an example of transmission information broadcasted from the beacon device 100. The advertising packet is transmitted to notify the smartphone 200 of the existence of the beacon device 100.

For example, the CPU 110 determines various parameters (advertising parameters) of the advertising packet to be transmitted. These parameters are determined using the command "LE Set Extended Advertising Parameters". This command enables the CPU 110 to determine, for example, the parameter representing a type of advertising packet ("Advertising_Handle"), the parameter representing a transmission power of the advertising packet ("Advertising_Tx_Power"), and the parameter representing the status of a notification in response to a scan request ("Scan_Request Notification_Enable"). In this embodiment, the CPU 110 sets "AUX_ADV_IND" as the type of advertising packet. The CPU 110 also assigns the value indicating the first transmission power to "AdvertisingTx_Power" and assigns the value indicating enablement of a notification in response to a scan request to "Scan_Request_Notification_Enable".

The CPU 110 then determines data (advertising data) superimposed on the advertising packet to be transmitted. The advertising data is determined using the command "LE Set Extended Advertising Data". In the case of the beacon device 100 installed at a store, for example, the data superimposed on the advertising packet is advertising information associated with products and services available at the store. The advertising packet in accordance with the Bluetooth (registered trademark) 5 specification is transmitted via data communication channels (described below) and can therefore accommodate advertising data having a higher volume than that of an existing advertising packet.

The CPU 110 then determines data (scan response data) superimposed on the scan response to be transmitted. The scan response data is determined using the command "LE Set Extended Scan Response Data".

Thereafter, the CPU 110 instructs the communicator 103 to start transmission of the advertising packet. The start of transmission of the advertising packet is determined using the command "LE Set Extended Advertising Enable". Specifically, the CPU 110 assigns the value indicating the start of transmission of the advertising packet to the parameter "Enable" of the command "LE Set Extended Advertising Enable".

If receiving the instruction to start transmission of the advertising packet from the CPU 110, the communicator 103 starts transmission of the advertising packet at the determined first transmission power. The communication based on the BLE standard uses the 40 channels resulting from division of the frequency band of 2.4 to 2.48 GHz into segments having a width of 2 MHz. These 40 channels are labeled with the respective numbers "0" to "39". Among these channels, the channels "0" to "36" contribute to data communication while the channels "37" to "39" contribute to transmission and reception of advertising packets. First, the communicator 103 transmits an advertising packet of the type "ADV_EXT_IND" via the channels "37" to "39", which advertising packet designates the channel used for transmission of an advertising packet among the channels "0" to "36". The communicator 103 then transmits an advertising packet of the type "AUX_ADV_IND" to the smartphone 200 via the channel designated by the advertising packet of the type "ADV_EXT_IND".

If the CPU 110 is notified of completed reception of a scan request from the communicator 103 after outputting the instruction to start transmission of the advertising packet, the CPU 110 instructs the communicator 103 to stop transmission of the advertising packet. Specifically, the CPU 110 assigns the value indicating stop of transmission of the advertising packet to the parameter "Enable" of the command "LE Set Extended Scan Response Data".

The CPU 110 then determines the transmission power to be the second transmission power higher than the first transmission power using the command "LE Set Extended Advertising Parameters". The CPU 110 determines the advertising data and extended scan response in the same manner as before the change of transmission power, and outputs an instruction to start transmission of the advertising packet. If receiving the instruction to start transmission of the advertising packet from the CPU 110, the communicator 103 starts transmission of the advertising packet at the determined second transmission power.

If no scan request has been received for a predetermined time from the change of transmission power from the first transmission power to the second transmission power, the CPU 110 changes the transmission power from the second transmission power back to the first transmission power. Specifically, the CPU 110 measures an elapsed time from the start of transmission of the advertising packet at the second transmission power. If any scan request is received before the measured elapsed time exceeds a predetermined time, the CPU 110 resets the elapsed time and resumes measuring an elapsed time. In contrast, if the measured elapsed time exceeds the predetermined time, the CPU 110 instructs the communicator 103 to stop transmission of the advertising packet. Specifically, the CPU 110 assigns the value indicating stop of transmission of the advertising packet to the parameter "Enable" of the command "LE Set Extended Scan Response Data".

The CPU 110 then determines the transmission power to be the first transmission power using the command "LE Set Extended Advertising Parameters". The CPU 110 determines the advertising data and scan response and outputs an instruction to start transmission of the advertising packet. If receiving the instruction to start transmission of the advertising packet from the CPU 110, the communicator 103 starts transmission of the advertising packet at the determined first transmission power.

A functional configuration of the CPU 210 of the smartphone 200 according to the embodiment will now be described. With reference to FIG. 3, the CPU 210 functions as an advertise reception controller 221. Alternatively, the functions of the advertise reception controller 221 may be performed by a processor, such as the CPU of the communicator 203, other than the microcomputer 201.

The CPU 210 functioning as the advertise reception controller 221 controls the communicator 203 such that the communicator 203 receives the advertising packet broadcasted from the beacon device 100. The CPU 210 then controls the communicator 203 such that the communicator 203 transmits a scan request corresponding on the received advertising packet. The CPU 210 then controls the communicator 203 such that the communicator 203 receives an advertising packet from the beacon device 100 that received the scan request.

For example, first, the CPU 210 executes setting (scan setting) for reception of an extended advertising packet. Specifically, the CPU 210 determines various parameters (scan parameters) for a scanning operation on advertising packets. These parameters are determined using the command "LE Set Extended Scan Parameters". Specifically, the CPU 210 assigns the value of active scan, which indicates transmission of a scan request in response to reception of an advertising packet, to the parameter "Scan_Type" of the command "LE Set Extended Scan Parameters".

The CPU 210 then instructs the communicator 203 to start a scanning operation. The start of the scanning operation is determined using the command "LE Set Extended Scan Enable". Specifically, the CPU 210 assigns the value indicating start of the scanning operation to the parameter "Enable" of the command "LE Set Extended Scan Enable".

The communicator 203 receives the advertising packet of the type "ADV_EXT_IND" from the beacon device 100 via the channels "37" to "39". The communicator 203 then receives the extended advertising packet of the type "AUX_ADV_IND" via the channel designated by the previously received advertising packet. If receiving the advertising packet, the communicator 203 outputs an advertise notification indicating completed reception of the advertising packet to the CPU 210. If receiving the advertise notification from the communicator 203, the CPU 210 acquires data contained in the advertising packet received by the communicator 203 and causes the display 206 to display the acquired data.

Figure 4:
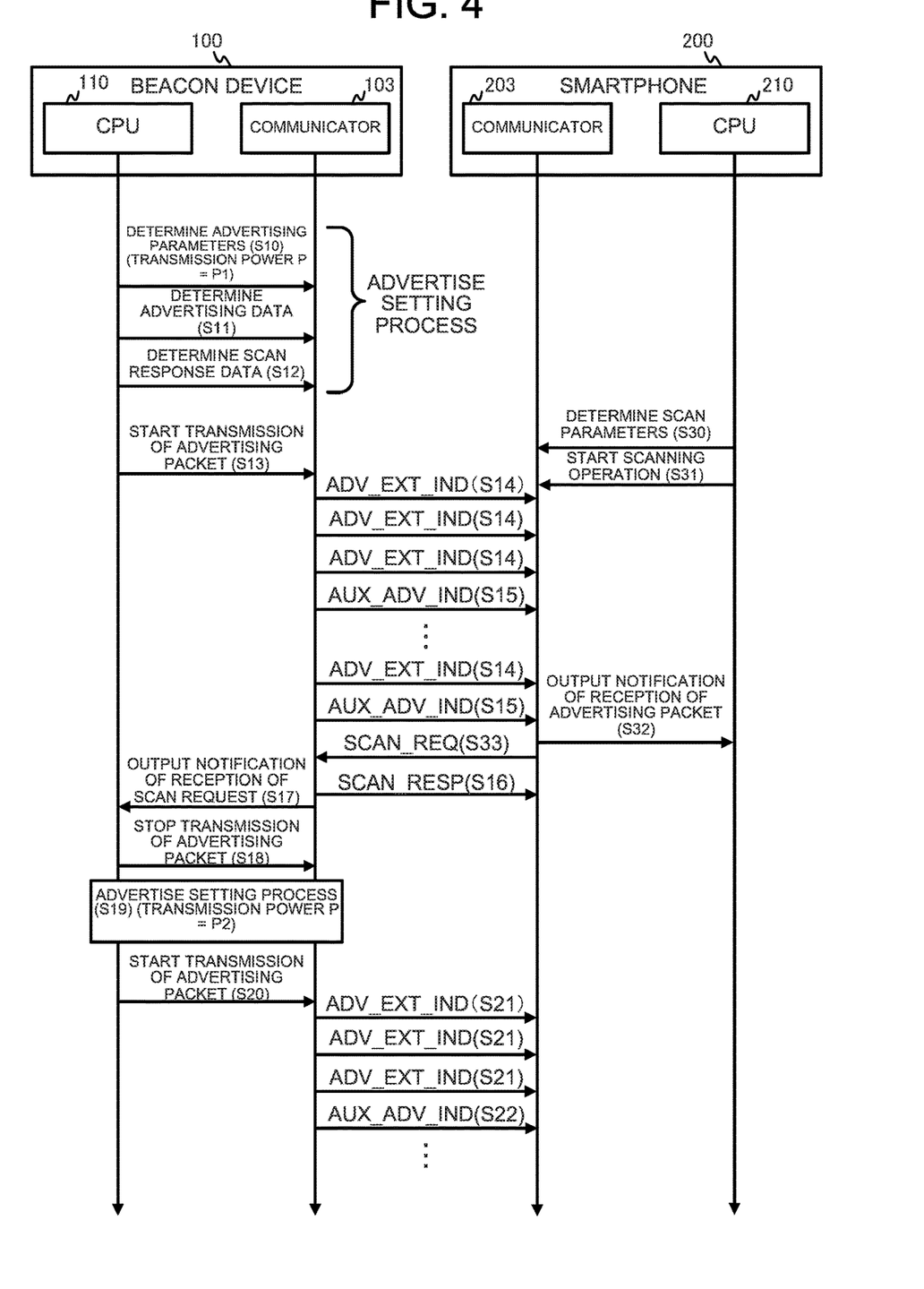
FIG. 4 is a sequence diagram illustrating an exemplary advertising operation of the wireless communication system according to the embodiment.
Figure 5:
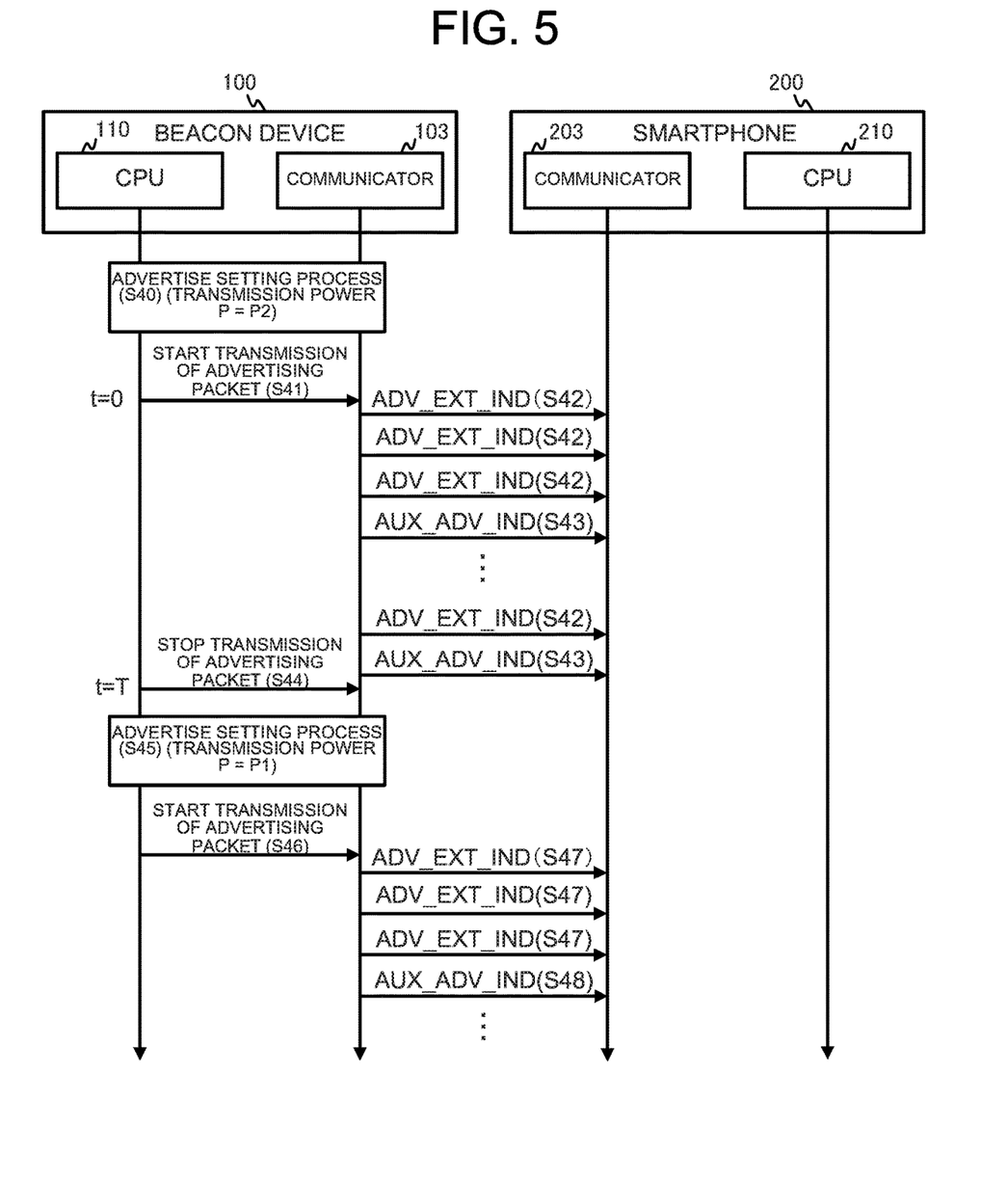
FIG. 5 is a sequence diagram illustrating another exemplary advertising operation of the wireless communication system according to the embodiment.

Operations of the wireless communication system 1 according to the embodiment will now be explained. FIGS. 4 and 5 are sequence diagrams each illustrating an exemplary advertising operation of the wireless communication system 1 according to the embodiment.

With reference to FIG. 4, the following explanation focuses on exemplary operations of the CPU 110 and the communicator 103 of the beacon device 100 and the CPU 210 and the communicator 203 of the smartphone 200, in the case where the transmission power P is changed from the first transmission power P1 to the second transmission power P2 because the beacon device 100 receives the scan request from the smartphone 200.

First, the CPU 110 of the beacon device 100 determines the advertising parameters (Step S10). In this step, the CPU 110 determines the transmission power P to be the first transmission power P1.

The CPU 110 then determines the advertising data (Step S11). The CPU 110 also determines the scan response data (Step S12). The above-explained processes from Steps S10 to S12 are collectively called an advertise setting process.

The CPU 110 then outputs an instruction to start transmission of an advertising packet (Step S13). The communicator 103 transmits an advertising packet of the type "ADV_EXT_IND" via the individual channels "37" to "39", which advertising packet designates the channel used for transmission of an advertising packet of the type "AUX_ADV_IND" (Step S14). The communicator 103 transmits the advertising packet of the type "AUX_ADV_IND" via the channel designated by the advertising packet transmitted in Step S14 (Step S15). Thereafter, the communicator 103 repeats transmission of advertising packets of the type "ADV_EXT_IND" and advertising packets of the type "AUX_ADV_IND" at a predetermined interval at the first transmission power P1.

The CPU 210 of the smartphone 200 determines the scan parameters, for example, after every predetermined period, at predetermined date and time, or in response to an instruction from a user (Step S30). The CPU 210 then outputs an instruction to start the scanning operation (Step S31).

If receiving the advertising packet from the beacon device 100, the communicator 203 notifies the CPU 210 of completed reception of the advertising packet (Step S32), and transmits a scan request (SCAN_REQ) to the beacon device 100 (Step S33).

If receiving the scan request from the smartphone 200, the communicator 103 of the beacon device 100 transmits a scan response (SCAN_RESP) to the smartphone 200 (Step S16), and notifies the CPU 110 of completed reception of the scan request (Step S17).

The CPU 110 then outputs an instruction to stop transmission of the advertising packet (Step S18). The CPU 110 then executes the advertise setting process (Step S19). In this step, the CPU 110 determines the transmission power P to be the second transmission power P2.

The CPU 110 then outputs an instruction to start transmission of the advertising packet (Step S20). Accordingly, the communicator 103 repeats transmission of advertising packets of the type "ADV_EXT_IND" and advertising packets of the type "AUX_ADV_IND" at a predetermined interval, as in Steps S14 and S15, at the second transmission power P2 (Steps S21 and S22).

With reference to FIG. 5, the following explanation focuses on exemplary operations of the CPU 110 and the communicator 103 of the beacon device 100 and the CPU 210 and the communicator 203 of the smartphone 200, in the case where the transmission power P is changed from the second transmission power P2 to the first transmission power P1 because the beacon device 100 has received no scan request from the smartphone 200 for the predetermined time T from the change of the transmission power P to the second transmission power P2 as illustrated in FIG. 4.

The explanation starts from the timing when the CPU 110 determines the transmission power P to be the second transmission power P2 in the advertise setting process in Step S40. After executing the advertise setting process (Step S40), the CPU 110 outputs an instruction to start transmission of the advertising packet (Step S41). Accordingly, the communicator 103 repeats transmission of advertising packets of the type "ADV_EXT_IND" and advertising packets of the type "AUX_ADV_IND" at a predetermined interval, as in Steps S14 and S15 in FIG. 4, at the second transmission power P2 (Steps S42 and S43). After outputting the instruction to start transmission of the advertising packet, the CPU 110 starts measuring an elapsed time t from the start of transmission. The CPU 110 resets the elapsed time t every time when being notified by the communicator 103 of completed reception of the scan request from the smartphone 200.

If determining that the elapsed time t exceeds a predetermined time T, the CPU 110 outputs an instruction to stop transmission of the advertising packet (Step S44). The CPU 110 then executes the advertise setting process (Step S45). In this step, the CPU 110 determines the transmission power P to be the first transmission power P1.

The CPU 110 then outputs an instruction to start transmission of the advertising packet (Step S46). Accordingly, the communicator 103 repeats transmission of advertising packets of the type "ADV_EXT_IND" and advertising packets of the type "AUX_ADV_IND" at a predetermined interval, as in Steps S14 and S15, at the first transmission power P1 (Steps S47 and S48).

Figure 6:
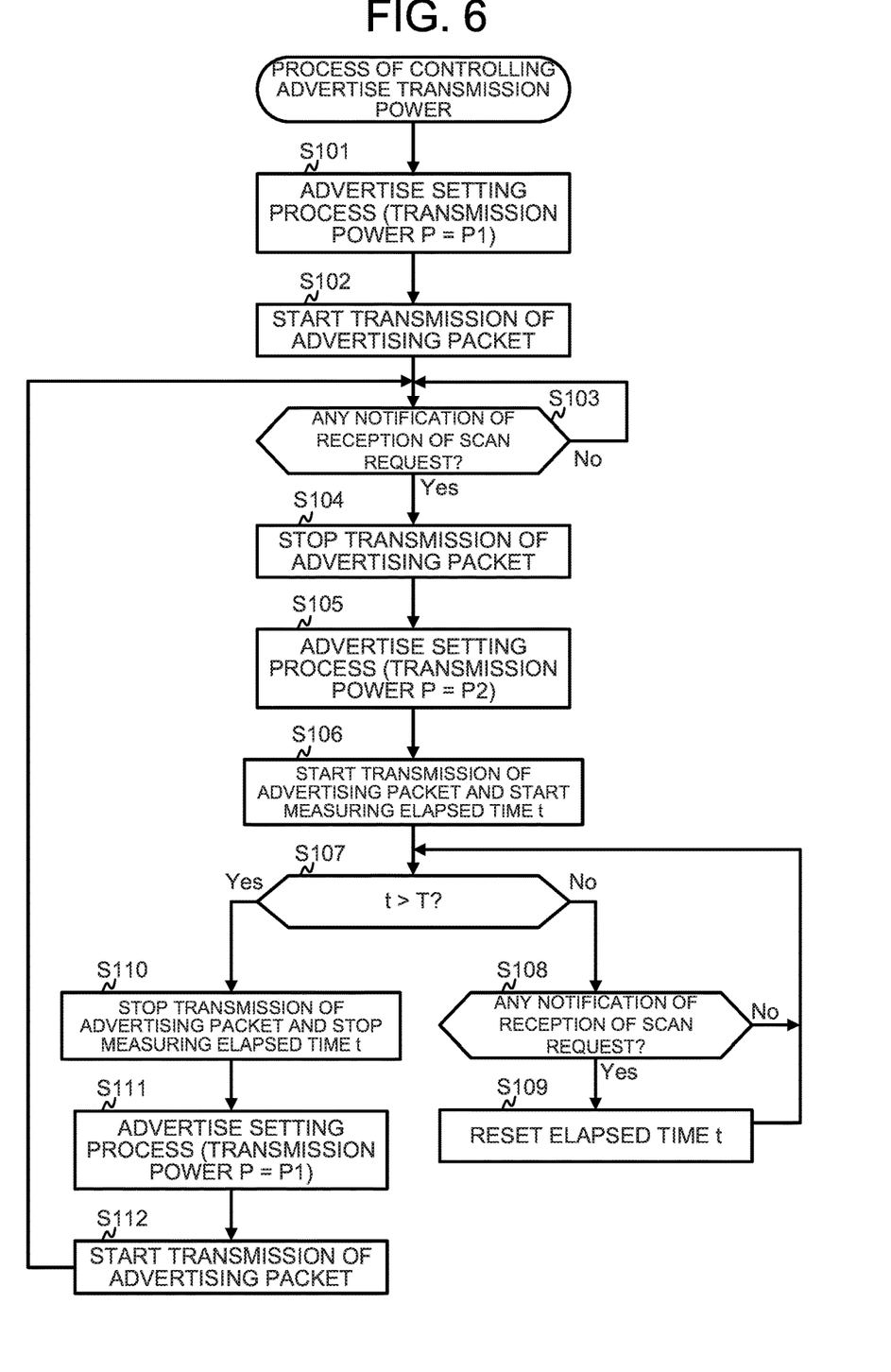
FIG. 6 is an exemplary flowchart illustrating a process of controlling advertise transmission power executed by a CPU of the beacon device according to the embodiment.

Operations of the beacon device 100 according to the embodiment will now be explained in detail. FIG. 6 is an exemplary flowchart illustrating a process of controlling advertise transmission power executed by the CPU 110 of the beacon device 100 according to the embodiment. The CPU 110 starts this process in response to the power-on of the beacon device 100.

First, the CPU 110 executes the advertise setting process (Step S101). In this step, the CPU 110 determines the transmission power P to be the first transmission power P1.

The CPU 110 then outputs an instruction to start transmission of the advertising packet (Step S102).

The CPU 110 then determines whether to be notified by the communicator 103 of completed reception of a scan request from the smartphone 200 (Step S103). The CPU 110 waits until being notified of completed reception (Step S103; No).

If being notified of completed reception of a scan request (Step S103; Yes), the CPU 110 outputs an instruction to stop transmission of the advertising packet (Step S104).

The CPU 110 then executes the advertise setting process (Step S105). In this step, the CPU 110 determines the transmission power P to be the second transmission power P2.

The CPU 110 then outputs an instruction to start transmission of the advertising packet and starts measuring the elapsed time t (Step S106).

The CPU 110 then determines whether the elapsed time t exceeds the predetermined time T (Step S107). If determining that the elapsed time t does not exceed the predetermined time T (Step S107; No), the CPU 110 determines whether to be notified by the communicator 103 of completed reception of a scan request from the smartphone 200 (Step S108).

If determining that the CPU 110 is not notified of completed reception of a scan request (Step S108; No), the CPU 110 returns to Step S107. In contrast, if determining that the CPU 110 is notified of completed reception of a scan request (Step S108; Yes), the CPU 110 resets the elapsed time t (Step S109) and returns to Step S107.

In contrast, if determining that the elapsed time t exceeds the predetermined time T (Step S107; Yes), the CPU 110 outputs an instruction to stop transmission of the advertising packet and stops measuring the elapsed time t (Step S110).

The CPU 110 then executes the advertise setting process (Step S111). In this step, the CPU 110 determines the transmission power P to be the first transmission power P1.

The CPU 110 then outputs an instruction to start transmission of the advertising packet (Step S112) and returns to Step S103.

The above-explained process of controlling advertise transmission power is repeated by the CPU 110 until the power-off of the beacon device 100, for example.

As explained above, the beacon device 100 according to the embodiment broadcasts an advertising packet at the first transmission power. If the communicator 103 receives a scan request from the smartphone 200 that received the advertising packet, the beacon device 100 controls the communicator 103 so as to change the transmission power of the advertising packet from the first transmission power to the second transmission power higher than the first transmission power. That is, the beacon device 100 can broadcast an advertising packet at a low transmission power in the absence of a smartphone 200 near the beacon device 100 and can transmit an advertising packet at a normal or high transmission power in the presence of a smartphone 200 near the beacon device 100. This configuration can avoid waste of electric power caused by broadcasting of advertising packets at a normal or high transmission power despite of the absence of a smartphone 200.

If the beacon device 100 according to the embodiment has received no scan request for the predetermined time from the change of transmission power from the first transmission power to the second transmission power, the beacon device 100 changes the transmission power from the second transmission power back to the first transmission power. That is, the beacon device 100 transmits an advertising packet at the original low transmission power after the smartphone 200 exits the vicinity of the beacon device 100. This configuration can avoid waste of electric power.

The above embodiment should not be construed as limiting the disclosure but may be modified in various manners.

For example, in the above embodiment, when the communicator 103 receives a scan request from the smartphone 200 that received the advertising packet, the beacon device 100 controls the communicator 103 so as to change the transmission power of the advertising packet from the first transmission power to the second transmission power higher than the first transmission power. Alternatively, the beacon device 100 may control the communicator 103 so as to change the transmission power of the advertising packet from the first transmission power to a second transmission power lower than the first transmission power, when the communicator 103 receives a scan request.

Figure 7A:
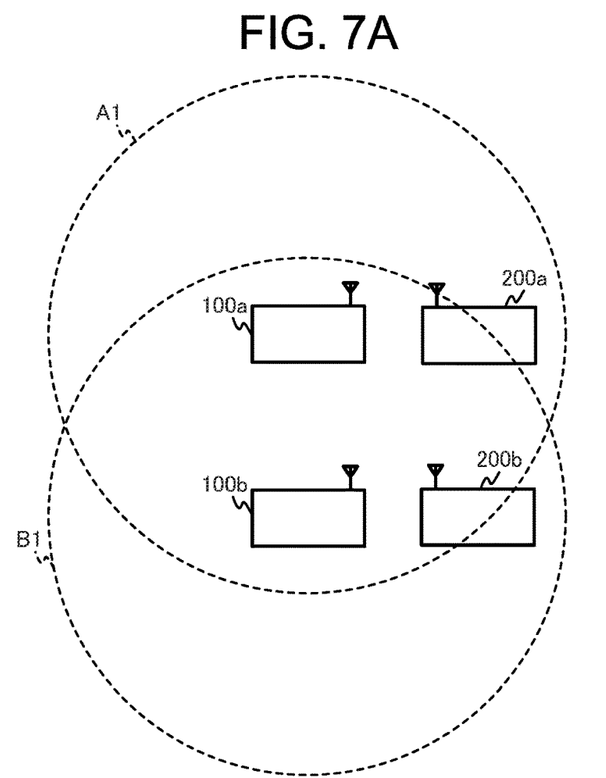
FIGS. 7A and 7B illustrate the ranges in which two beacon devices according to a modification are able to transmit advertising packets.
Figure 7B:
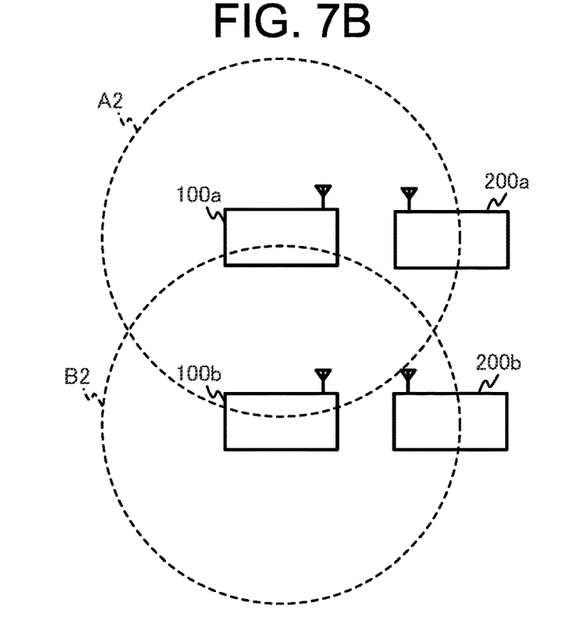

Such a modification will now be described with reference to FIGS. 7A and 7B. FIGS. 7A and 7B illustrate the ranges (transmission ranges) in which two beacon devices 100a and 100b are able to transmit advertising packets. A1 and B1 in FIG. 7A represent the transmission ranges of the respective beacon devices 100a and 100b broadcasting advertising packets at a first transmission power P1'. A2 and B2 in FIG. 7B represent the transmission ranges of the respective beacon devices 100a and 100b broadcasting advertising packets at a second transmission power P2' lower than the first transmission power P1'.

For example, with reference to FIG. 7A, the following description is directed to an exemplary case where smartphones 200a and 200b enter the transmission ranges A1 and B1 while the beacon devices 100a and 100b are broadcasting advertising packets at the first transmission power P1'. In this case, the smartphones 200a and 200b receive the advertising packets from the beacon devices 100a and 100b and transmit scan requests to the beacon devices 100a and 100b that transmitted these advertising packets. If receiving the scan requests from the smartphones 200a and 200b, the beacon devices 100a and 100b change the transmission power of the advertising packets from the first transmission power P1' to the second transmission power P2'. Accordingly, the transmission ranges of the beacon devices 100a and 100b are changed from the transmission ranges A1 and B1 to the transmission ranges A2 and B2 as illustrated in FIG. 7B. If the beacon devices 100a and 100b have received no scan request for a predetermined time from the change of transmission power to the second transmission power P2' because of exit of the smartphones 200a and 200b from the transmission ranges A2 and B2, the beacon devices 100a and 100b change the transmission power of the advertising packets from the second transmission power P2' to the first transmission power P1'. Accordingly, the transmission ranges of the beacon devices 100a and 100b are changed from the transmission ranges A2 and B2 back to the transmission ranges A1 and B1 as illustrated in FIG. 7A.

As described above, if the communicator 103 receives a scan request, the beacon device 100a or 100b may control the communicator 103 so as to change the transmission power of the advertising packets from the first transmission power to the second transmission power lower than the first transmission power. This configuration can reduce electric power consumption in comparison to the configuration in which advertising packets are broadcasted at the first transmission power all the time. Alternatively, if the communicator 103 receives two or more scan requests, the beacon device 100a or 100b may control the communicator 103 so as to change the transmission power of the advertising packets from the first transmission power to the second transmission power lower than the first transmission power, or to the second transmission power higher than the first transmission power. This configuration can effectively use electric power depending on the number of communication partners encompassed in the transmission range.

Alternatively, the beacon device 100a or 100b may broadcast an advertising packet only to the smartphone 200a or 200b that exists near the beacon device 100a or 100b itself.

The beacon devices 100a and 100b operate on low transmission power in the presence of the smartphones 200a and 200b (communication partners) near the beacon devices 100a and 100b. This configuration is advantageous for the case of two or more beacon devices, like the beacon devices 100a and 100b, because the configuration can reduce the radio wave interference between the beacon devices 100a and 100b.

In the above exemplary embodiments, the advertising data superimposed on an advertising packet broadcasted from the beacon device 100 is composed of advertising information. Alternatively, the advertising data superimposed on an advertising packet may be composed of dummy data having a lower volume than the advertising information, until when the beacon device 100 receives a scan request from the smartphone 200. That is, a smaller-volume advertising packet containing dummy data is broadcasted in the absence of a smartphone 200 around the beacon device 100, while an advertising packet containing advertising information is broadcasted in the presence of a smartphone 200 around the beacon device 100. This configuration can enable the beacon device 100 to transmit advertising information to the smartphone 200 around the beacon device 100 and can reduce electric power consumption.

Although the beacon devices 100, 100*a*, and 100*b* and the smartphones 200, 200*a*, and 200*b* conduct wireless communication with each other in the above exemplary embodiments, this example should not be construed as limiting the disclosure. The devices that conduct mutual wireless communication may also be other electronic devices having a wireless communication function, such as smartphones, cellular phones, personal computers (PCs), personal digital assistants (PDAs), electronic watches, and smartwatches.

The control operations are executed by the CPUs 110 and 210 in the above exemplary embodiments but should not necessarily be achieved by the software configurations of the CPUs 110 and 210. All or part of the control operations may be achieved by a hardware configuration, such as a dedicated logic circuit.

In the above exemplary embodiments, the ROMs 102 and 202 including non-volatile memories, such as flash memories, function as the non-transitory computer-readable recording mediums that store the programs 113 and 213 associated with the wireless communication control according to the disclosure. Alternatively, the non-transitory computer-readable recording mediums may be other portable recording mediums, such as hard disk drives (HDDs), compact disc read only memories (CD-ROMs), or digital versatile discs (DVDs).

Other detailed elements of the configurations, control procedures, and exemplary displays illustrated in the above embodiments may be appropriately modified without departing from the gist of the disclosure.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A wireless communication apparatus comprising:
a wireless communicator configured to wirelessly communicate with a plurality of other wireless communication apparatuses; and
a controller configured to (i) control the wireless communicator to broadcast transmission information including an advertising packet to the plurality of other wireless communication apparatuses, and (ii) when the wireless communicator receives a scan request corresponding on the transmission information from at least one of the other wireless communication apparatuses having received the transmission information during the broadcasting of the transmission information, the scan request indicating completion of reception of the transmission information including the advertising packet by the at least one of the other communication apparatuses, control the wireless communicator to change a transmission power of the transmission information to the at least one of the other wireless communication apparatuses in response to completion of reception of the scan request from the at least one of the other wireless communication apparatuses by the wireless communicator.

2. The wireless communication apparatus according to claim 1, wherein:
the controller controls the wireless communicator to broadcast the transmission information at a first transmission power, and
when the wireless communicator receives the scan request, the controller controls the wireless communicator to transmit the transmission information to the at least one of the other wireless communication apparatuses at a second transmission power higher than the first transmission power.

3. The wireless communication apparatus according to claim 2, wherein: when the wireless communicator receives the scan request, the controller controls the wireless communicator to transmit the transmission information at the second transmission power via a channel included in the transmission information broadcasted at the first transmission power.

4. The wireless communication apparatus according to claim 3, wherein the controller controls the wireless communicator to change the transmission power of the transmission information when the wireless communicator receives a plurality of the scan requests.

5. The wireless communication apparatus according to claim 3, wherein when the wireless communicator has received no scan request after a predetermined time has elapsed from a change of the transmission power, the controller controls the wireless communicator to change the transmission power of the transmission information back to the transmission power before the change.

6. The wireless communication apparatus according to claim 2, wherein the controller controls the wireless communicator to change the transmission power of the transmission information when the wireless communicator receives a plurality of the scan requests.

7. The wireless communication apparatus according to claim 2, wherein when the wireless communicator has received no scan request after a predetermined time has elapsed from a change of the transmission power, the controller controls the wireless communicator to change the transmission power of the transmission information back to the transmission power before the change.

8. The wireless communication apparatus according to claim 1, wherein
the controller controls the wireless communicator to broadcast the transmission information at a first transmission power, and
when the wireless communicator receives the scan request, the controller controls the wireless communicator to transmit the transmission information to the at least one of the other wireless communication apparatuses at a second transmission power lower than the first transmission power.

9. The wireless communication apparatus according to claim 8, wherein when the wireless communicator receives the scan request, the controller controls the wireless communicator to transmit the transmission information at the second transmission power via a channel included in the transmission information broadcasted at the first transmission power.

10. The wireless communication apparatus according to claim 9, wherein the controller controls the wireless communicator to change the transmission power of the transmission information when the wireless communicator receives a plurality of the scan requests.

11. The wireless communication apparatus according to claim 9, wherein when the wireless communicator has received no scan request after a predetermined time has elapsed from a change of the transmission power, the controller controls the wireless communicator to change the transmission power of the transmission information back to the transmission power before the change.

12. The wireless communication apparatus according to claim 8, wherein the controller controls the wireless communicator to change the transmission power of the transmission information when the wireless communicator receives a plurality of the scan requests.

13. The wireless communication apparatus according to claim 8, wherein when the wireless communicator has received no scan request after a predetermined time has elapsed from a change of the transmission power, the controller controls the wireless communicator to change the transmission power of the transmission information back to the transmission power before the change.

14. The wireless communication apparatus according to claim 1, wherein the controller controls the wireless communicator to change the transmission power of the transmission information when the wireless communicator receives a plurality of the scan requests.

15. The wireless communication apparatus according to claim 14, wherein when the wireless communicator has received no scan request after a predetermined time has elapsed from a change of the transmission power, the controller controls the wireless communicator to change the transmission power of the transmission information back to the transmission power before the change.

16. The wireless communication apparatus according to claim 1, wherein when the wireless communicator has received no scan request after a predetermined time has elapsed from a change of the transmission power, the controller controls the wireless communicator to change the transmission power of the transmission information back to the transmission power before the change.

17. The wireless communication apparatus according to claim 1, wherein:
the controller controls the wireless communicator to broadcast transmission information including dummy data, and
when the wireless communicator receives a scan request corresponding to the transmission information including the dummy data from at least one of the other wireless communication apparatuses having received the transmission information including the dummy data, the controller controls the wireless communicator to transmit, to the at least one of the other wireless communication apparatuses, transmission information including predetermined information instead of the dummy data, the predetermined information having a higher volume than the dummy data.

18. A wireless communication method executed by a wireless communication apparatus comprising a wireless communicator configured to wirelessly communicate with a plurality of other wireless communication apparatuses, the method comprising:
controlling the wireless communicator to broadcast transmission information including an advertising packet to the plurality of other wireless communication apparatuses, and
when the wireless communicator receives a scan request corresponding to the transmission information from at least one of the other wireless communication apparatuses having received the transmission information during the broadcasting of the transmission information, the scan request indicating completion of reception of the transmission information including the advertising packet by the at least one of the other communication apparatuses, controlling the wireless communicator to change a transmission power of the transmission information to the at least one of the other wireless communication apparatuses in response to completion of reception of the scan request from the at least one of the other wireless communication apparatuses by the wireless communicator.

19. A non-transitory computer-readable recording medium storing a program, the program causing a computer including a wireless communicator configured to wirelessly communicate with a plurality of wireless communication apparatuses to:
control the wireless communicator to broadcast transmission information including an advertising packet to the plurality of wireless communication apparatuses; and
when the wireless communicator receives a scan request corresponding to the transmission information from at least one of the wireless communication apparatuses having received the transmission information during the broadcasting of the transmission information, the scan request indicating completion of reception of the transmission information including the advertising packet by the at least one of the other communication apparatuses, control the wireless communicator to change a transmission power of the transmission information to the at least one of the wireless communication apparatuses in response to completion of reception of the scan request from the at least one of the other wireless communication apparatuses by the wireless communicator.

* * * * *

UNITED STATES PATENT AND TRADEMARK OFFICE
CERTIFICATE OF CORRECTION

PATENT NO. : 10,959,187 B2
APPLICATION NO. : 16/591547
DATED : March 23, 2021
INVENTOR(S) : Toshihiro Takahashi et al.

Page 1 of 1

It is certified that error appears in the above-identified patent and that said Letters Patent is hereby corrected as shown below:

In the Claims

Column 11, Line 62 Claim 1, delete "on" and insert --to--.

Column 12, Line 22 Claim 3, delete "wherein:" and insert --wherein--.

Column 12, Line 54 Claim 8, delete "wherein" and insert --wherein:--.

Signed and Sealed this
First Day of March, 2022

Drew Hirshfeld
*Performing the Functions and Duties of the*
*Under Secretary of Commerce for Intellectual Property and*
*Director of the United States Patent and Trademark Office*